United States Patent [19]

Yamazaki et al.

[11] Patent Number: 5,743,230
[45] Date of Patent: Apr. 28, 1998

[54] BALANCER SHAFT SUPPORTING STRUCTURE IN ENGINE

[75] Inventors: Masakazu Yamazaki; Kensuke Nakamura; Fuminori Kawashima; Nobuyoshi Takamatsu; Toru Kano; Tomoki Okita; Hideo Ueshima, all of Wako, Japan

[73] Assignee: Honda Giken Kogyo Kabushiki Kaisha, Tokyo, Japan

[21] Appl. No.: 795,302

[22] Filed: Feb. 4, 1997

[30] Foreign Application Priority Data

Feb. 6, 1996 [JP] Japan .................. 8-020297
Feb. 6, 1996 [JP] Japan .................. 8-020299

[51] Int. Cl.$^6$ .................. F02F 7/00; F02B 75/06
[52] U.S. Cl. .................. 123/195 H; 123/192.2; 384/432
[58] Field of Search .................. 123/195 H, 192.2; 384/428, 429, 432

[56] References Cited

U.S. PATENT DOCUMENTS

| 4,644,911 | 2/1987 | Hidaka et al. | 123/195 H |
| 4,656,983 | 4/1987 | Anno | 123/195 H |
| 4,677,948 | 7/1987 | Candea | 123/192.2 |
| 4,703,724 | 11/1987 | Candea et al. | 123/196 R |
| 4,703,725 | 11/1987 | Weertman | 123/192.2 |
| 4,781,156 | 11/1988 | Berger et al. | 123/192.2 |
| 4,838,221 | 6/1989 | Suemori | 123/195 H |
| 4,856,486 | 8/1989 | Mori et al. | 123/195 H |
| 4,993,378 | 2/1991 | Sakurahara et al. | 123/195 R |
| 5,083,535 | 1/1992 | Deschler et al. | 123/192.2 |
| 5,133,313 | 7/1992 | Inoue et al. | 123/195 H |
| 5,305,656 | 4/1994 | Kamiya et al. | 123/192.2 |

FOREIGN PATENT DOCUMENTS

| 2 573 846 | 5/1986 | France . |
| 59-155553 | 9/1984 | Japan . |
| 61-36828 | 10/1986 | Japan . |
| 63-021312 | 1/1988 | Japan . |
| 2-217646 | 8/1990 | Japan . |
| 5-321982 | 12/1993 | Japan . |
| 2 228 047 | 8/1990 | United Kingdom . |

Primary Examiner—David A. Okonsky
Attorney, Agent, or Firm—Armstrong, Westerman, Hattori, McLeland & Naughton

[57] ABSTRACT

An engine having a lower block made of an aluminum-based material and having a bearing cap mounted therein in a cast-in manner abutting against front and rear sidewalls of a cylinder block of the engine and coupled to the cylinder block by a bolt, and a pump body is coupled to a lower surface of the lower block by bolts. The pump body also serves as a balancer shaft supporting member, and a journal portion of a balancer shaft is supported on the balancer shaft supporting member. Thus, the rigidity of supporting of the balancer shaft on the balancer shaft supporting member can be enhanced without an increase in size of the balancer shaft supporting member of the engine.

13 Claims, 13 Drawing Sheets

5,743,230

BALANCER SHAFT SUPPORTING STRUCTURE IN ENGINE

BACKGROUND OF THE INVENTION

1. Field of the Invention

The present invention relates to an engine including a balancer shaft disposed below a cylinder block, and more particularly, to a balancer shaft supporting structure.

2. Description of the Related Art

Japanese Utility Model Publication No. 61-36828 discloses a known design for an engine including a balancer shaft. This engine includes a bearing member (a balancer shaft supporting member) fixed to opposite sidewalls of the cylinder block. A balancer shaft is supported on the bearing member.

The known engine suffers from a disadvantage in that because the bearing member is fixed to connect the opposite sidewalls of the cylinder block to each other, a load applied to the opposite sidewalls is transmitted directly to the bearing member and as a result, the supporting rigidity of the balancer shaft is poor. To remedy this problem, the bearing member may be large-sized to enhance rigidity, but the employment of such a measure results in an increase in weight.

SUMMARY OF THE INVENTION

Accordingly, it is an object of the present invention to enhance the supporting rigidity of the balancer shaft without increasing the size of the balancer shaft supporting member.

To achieve the above object, according to a first aspect and feature of the present invention, there is provided a balancer shaft supporting structure in an en engine including a balancer shaft disposed below a cylinder block, the balancer shaft supporting structure comprising a lower block which abuts against opposite sidewalls of the cylinder block and has a bearing cap for supporting journal portions of a crankshaft, and a balancer shaft supporting member for supporting the balancer shaft, the balancer shaft supporting member abutting against a lower surface of the lower block. The lower block and the balancer shaft supporting member are commonly clamped to the cylinder block by a common bolt passing through a bolt bore which is utilized as an oil passage for supplying oil to journal portions of the balancer shaft.

With such an arrangement, it is possible not only to enhance the supporting rigidity for the crankshaft and the balancer shaft, as compared with the case where the balancer shaft supporting member is fixed directly to the cylinder block, but also to reduce the size of the balancer shaft supporting member, because it is unnecessary to enhance the rigidity of the balancer shaft supporting member itself. In addition, the number of the bolts is reduced, which saves space, but also when the balancer shaft supporting member is not required, the lower block can be fixed to the cylinder block by using only a short bolt. Moreover, since the bore for insertion of the bolt is utilized as the oil passage, it is unnecessary to define an exclusive oil passage, which permits a reduction in the number of machining steps.

According to a second aspect and feature of the present invention, there is provided a balancer shaft supporting structure in an engine including a balancer shaft disposed below a cylinder block, the balancer shaft supporting structure comprising a lower block which is fixed to opposite sidewalls of the cylinder block and has a bearing cap for supporting journal portions of a crankshaft, a balancer shaft supporting member fixed to a lower surface of the lower block for supporting the balancer shaft, an oil jet disposed in a recess defined in mated surfaces of the lower block and the balancer shaft supporting member for supplying an oil to an endless chain for driving the balancer shaft, and an oil passage for supplying the oil to the oil jet, the oil passage being in communication with an oil passage defined in the balancer shaft supporting member to supply the oil to journal portions of the balancer shaft.

With the above arrangement, it is possible not only to enhance the supporting rigidity for the crankshaft and the balancer shaft, as compared with the case where the balancer shaft supporting member is fixed directly to the cylinder block, but also to reduce the size of the balancer shaft supporting member, because it is unnecessary to enhance the rigidity of the balancer shaft supporting member itself. In addition, the oil jet can be laid out in a compact manner, but also the number of machined oil passages connected to the oil jet can be reduced.

According to a third aspect and feature of the present invention, there is provided a balancer shaft supporting structure in an engine including a balancer shaft disposed below a cylinder block, the balancer shaft supporting structure comprising a lower block made of an aluminum-based material and fixed to opposite sidewalls of the cylinder block made of an aluminum-based material, the lower block having a bearing cap made of an iron-based material and embedded therein for supporting journal portions of a crankshaft, a balancer shaft supporting member fixed to a lower surface of the lower block for supporting the balancer shaft, and an oil passage for supplying oil to the journal portions of the crankshaft, the oil passage being defined in that surface of the cylinder block with the lower block coupled thereto, which is opposed to the bearing cap, so as to diverge from an oil passage for supplying the oil to journal portions of the balancer shaft.

With the above arrangement, it is possible not only to enhance the supporting rigidity for the crankshaft and the balancer shaft, as compared with the case where the balancer shaft supporting member is fixed directly to the cylinder block, but also to reduce the size of the balancer shaft supporting member, because it is unnecessary to enhance the rigidity of the balancer shaft supporting member itself. Moreover, the weight of the lower block can be reduced, while the crankshaft supporting rigidity is enhanced as a result of the bearing cap being made of the iron-based material. Additionally, it is easy to configure the oil passage for supplying the oil to the journal portions of the crankshaft.

According to a fourth aspect and feature of the present invention, there is provided a balancer shaft supporting structure in an engine including a balancer shaft disposed below a cylinder block, the balancer shaft supporting structure comprising a lower block which is made of an aluminum-based material and abutting against oppositesidewalls of the cylinder block, and which has a bearing cap made of an iron-based material for supporting journal portions of a crankshaft, and a balancer shaft supporting member disposed to abut against a lower surface of the lower block for supporting the balancer shaft, the lower block and the balancer shaft supporting member being commonly clamped to the cylinder block by a common bolt.

With the above arrangement, it is possible not only to enhance the supporting rigidity for the crankshaft and the balancer shaft, as compared with the case where the balancer shaft supporting member is fixedly directly to the cylinder block, but also to reduce the size of the balancer shaft supporting member, because it is unnecessary to enhance the rigidity for the balancer shaft supporting member itself. Moreover, the weight of the lower block can be reduced, while enhancing the crankshaft supporting rigidity with the bearing cap. In addition, the number of the bolts is reduced, which saves space, but also when the balancer shaft supporting member is not required, the lower block can be fixed to the cylinder block only by using a short bolt.

The above and other objects, features and advantages of the invention will become apparent from the following description of the preferred embodiments taken in conjunction with the accompanying drawings.

BRIEF DESCRIPTION OF THE DRAWINGS

FIGS. 1 to 12 illustrate a first embodiment of the present invention, wherein

FIG. 1 is a vertical sectional view of an engine;

FIG. 2 is a sectional view taken along a line 2—2 in FIG. 1;

FIG. 3 is a view taken in a direction of an arrow 3 in FIG. 2;

FIG. 4 is an enlarged view taken along a line 4—4 in FIG. 2 (a lower side view of the secondary balancer device);

FIG. 5 is a view taken along a line 5—5 in FIG. 4;

FIG. 6 is a sectional view taken along a line 6—6 in FIG. 4;

FIG. 7 is a sectional view taken along a line 7—7 in FIG. 2;

FIG. 8 is a sectional view taken along a line 8—8 in FIG. 2;

FIG. 9 is a sectional view taken along a line 9—9 in FIG. 2;

FIG. 10 is a sectional view taken along a line 10—10 in FIG. 7;

FIG. 11 is a sectional view taken along a line 11—11 in FIG. 10;

FIG. 12 is an enlarged view of an essential portion shown in FIG. 7; and

DESCRIPTION OF THE PREFERRED EMBODIMENTS

A first embodiment of the present invention will first be described with reference to FIGS. 1 to 12.

Figure 1:
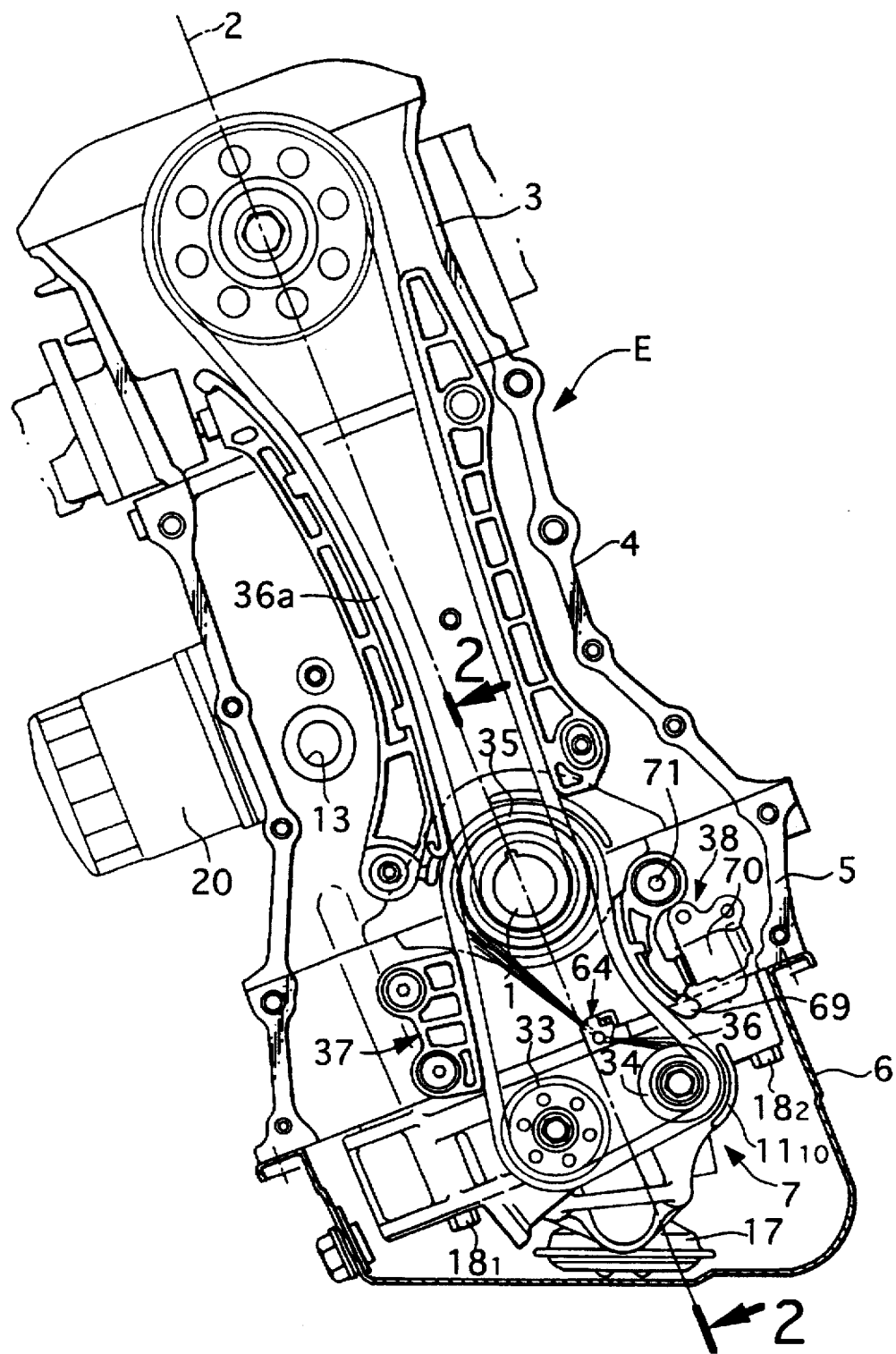
Figure 2:
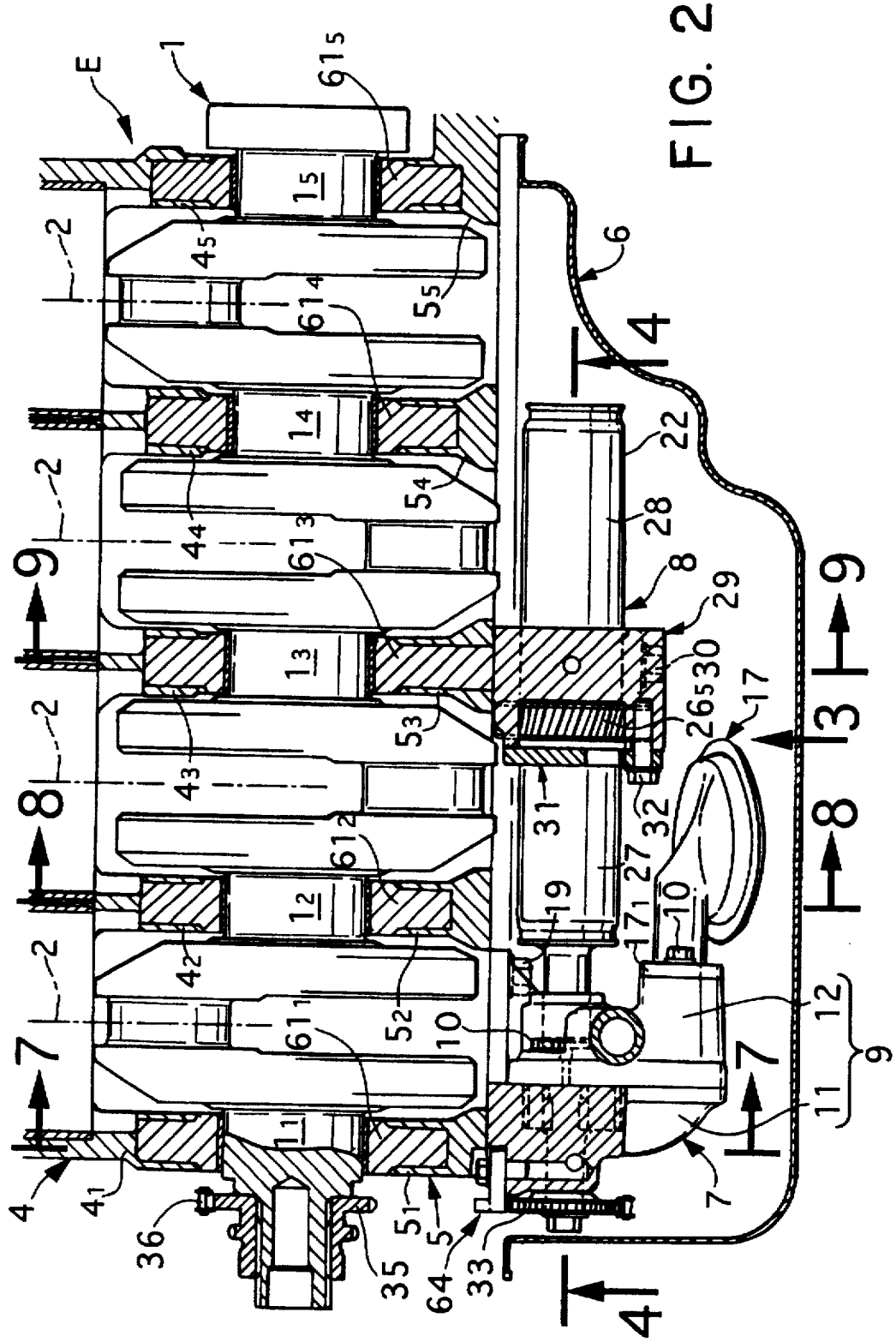
Figure 3:
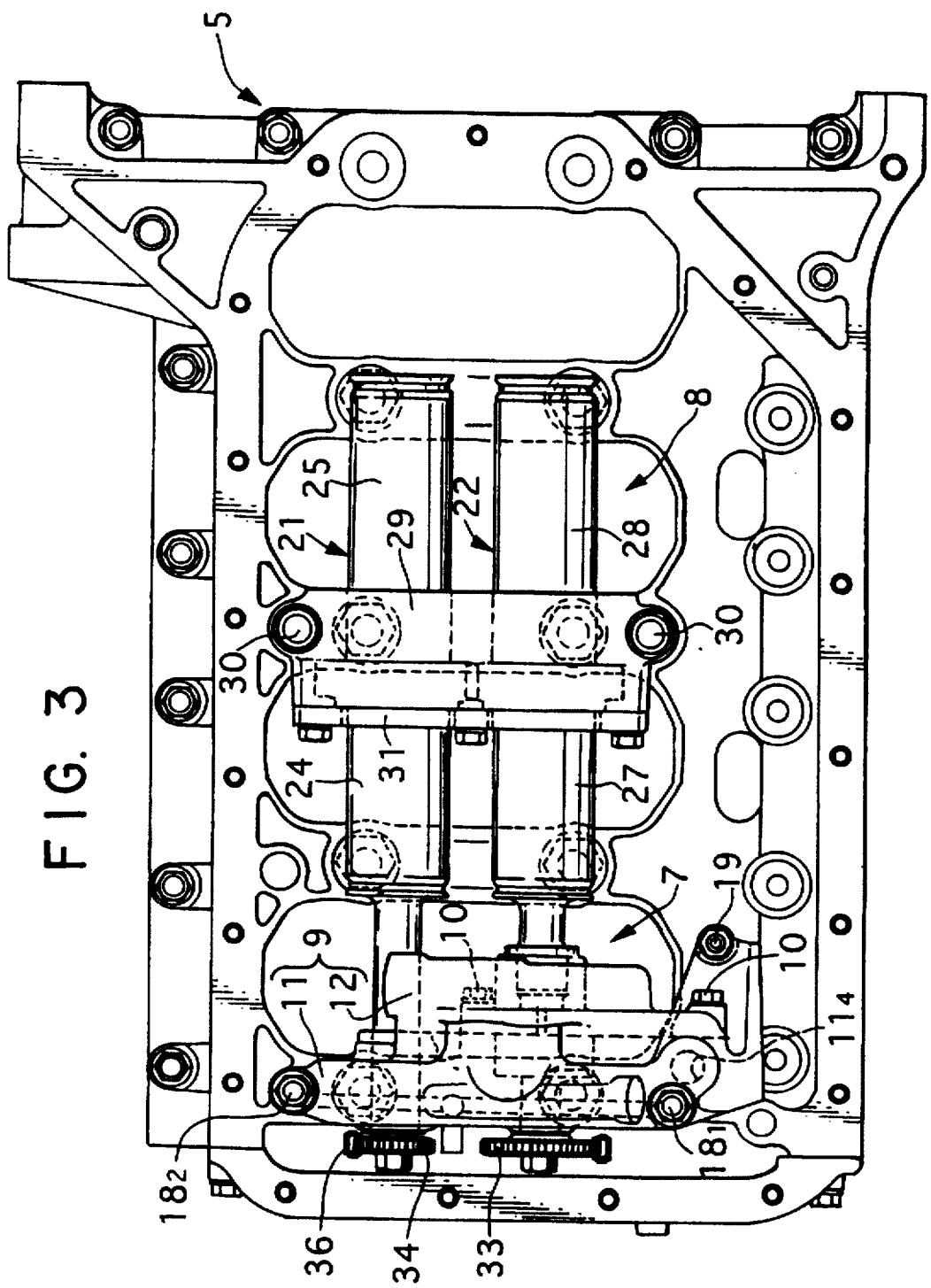

Referring to FIGS. 1 to 3, an engine E in the present embodiment is an in-line 4-cylinder engine which has a crankshaft 1 disposed horizontally and four cylinder axes 2 - - - disposed substantially vertically. An engine body includes a cylinder head 3, a cylinder block 4 coupled to a lower surface of the cylinder head 3, a lower block 5 coupled to a lower surface of the cylinder block 4, and an oil pan 6 coupled to a lower surface of the lower block 5. #1, #2, #3, #4 and #5 journal portions $1_1$, $1_2$, $1_3$, $1_4$ and $1_5$ of the crankshaft 1 are clamped and rotatably carried between five journal support portions $4_1$, $4_2$, $4_3$, $4_4$ and $4_5$ formed on the lower surface of the cylinder block 4 and five journal support portions $5_1$, $5_2$, $5_3$, $5_4$ and $5_5$ formed on an upper surface of the lower block 5.

The lower surface of the lower block 5 is provided with an oil pump 7 comprised of a trochoidal pump and a secondary balancer device 8 for reducing the secondary vibration of the engine E. The oil pump 7 and the secondary balancer device 8 are immersed in oil which accumulates in the oil pan 6. The oil pan 6 has a depth at a location below the #1 journal portion $1_1$ greater than that at a location below the #4 journal portion $1_4$, which is convenient for disposition of the oil pump 7.

Figure 4:
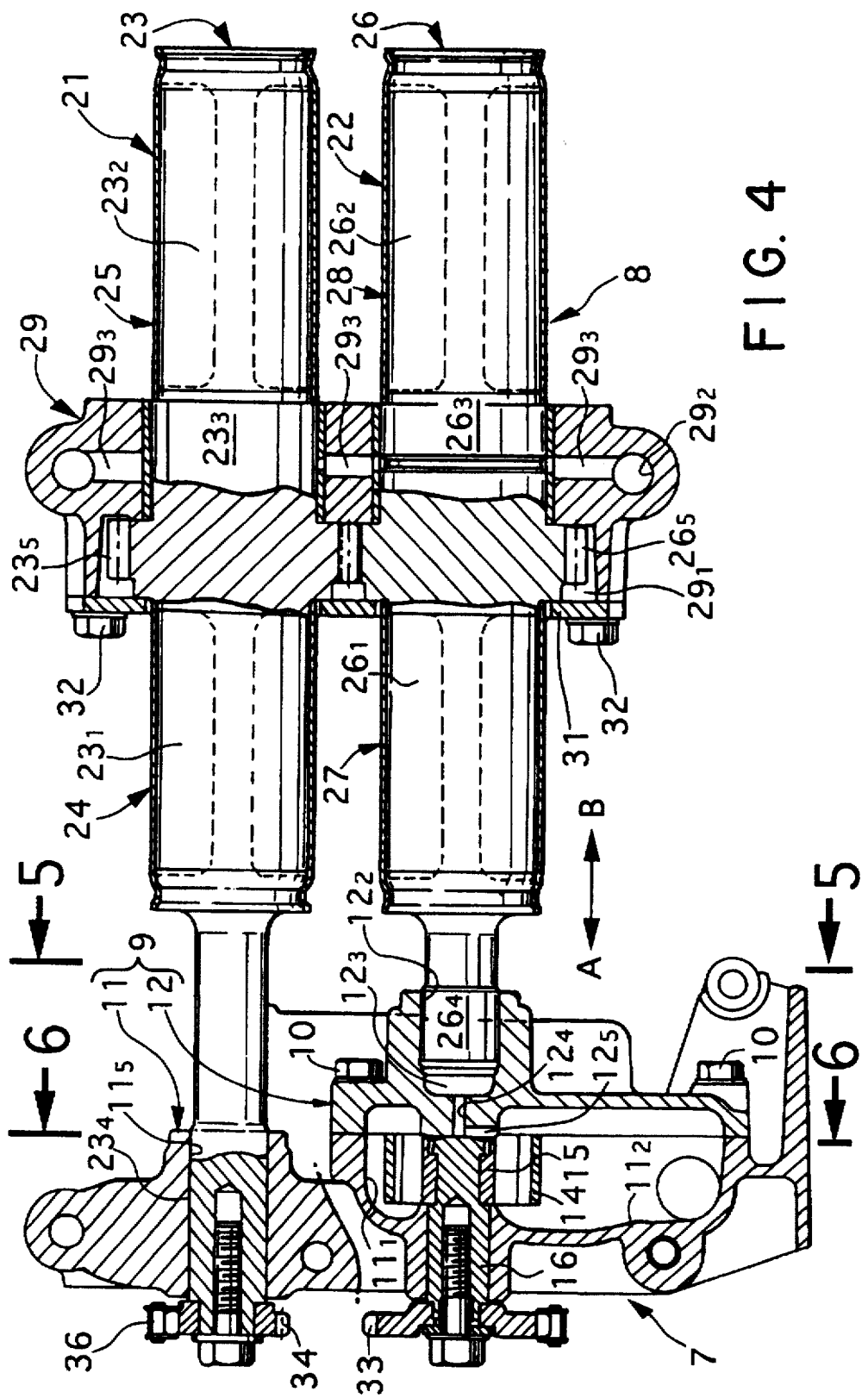
Figure 5:
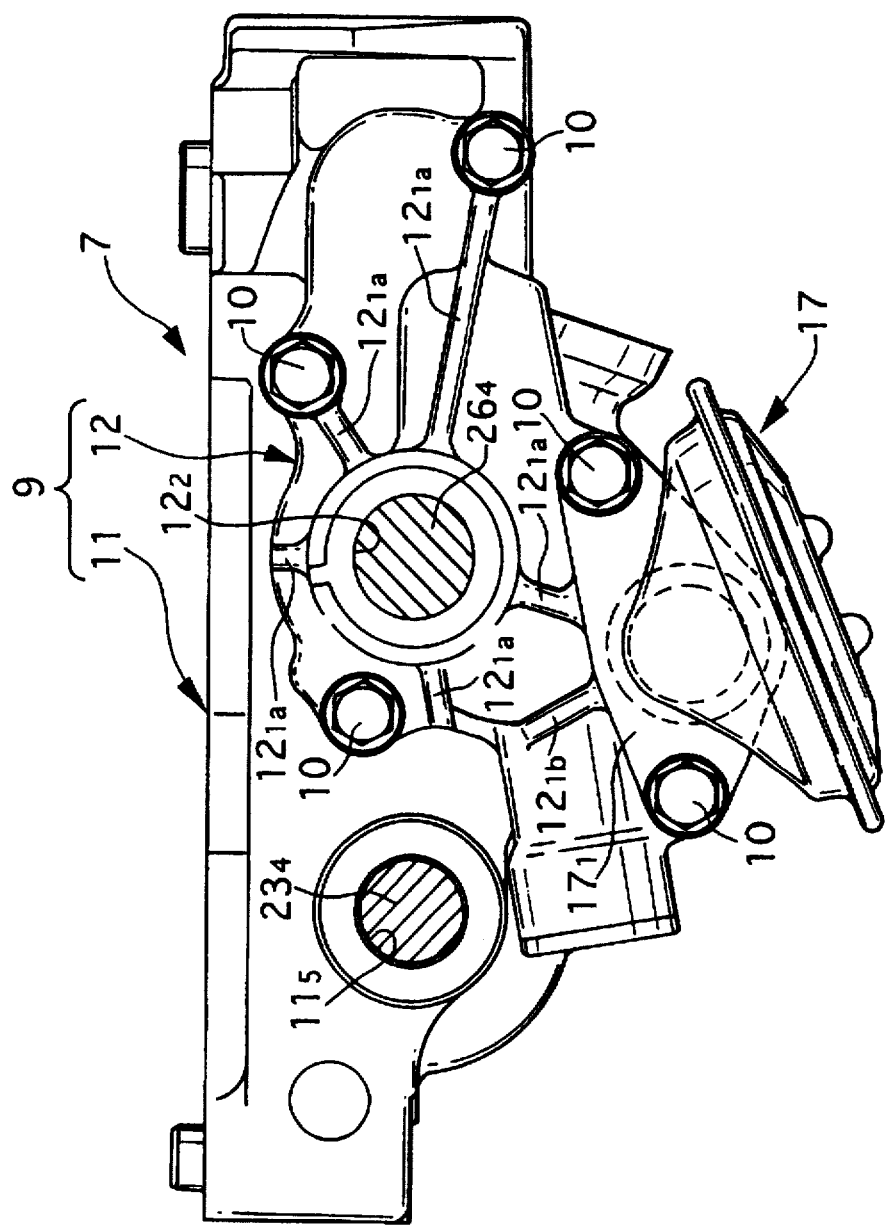
Figure 6:
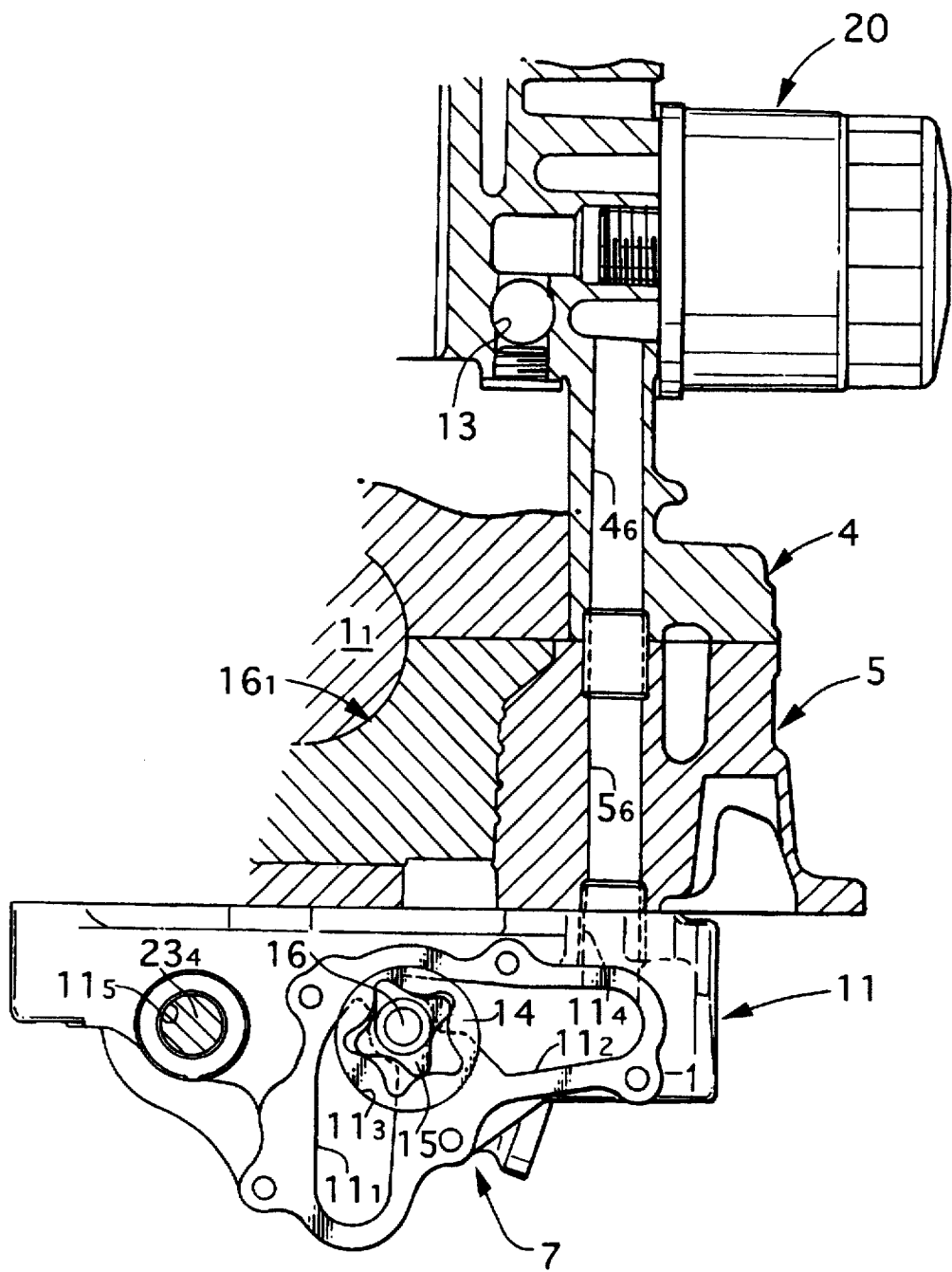

As can be seen from FIGS. 4 to 6, a pump housing 9 of the oil pump 7 coupled to a lower surface of the journal portion $5_1$ of the lower block 5 is comprised of two members: a pump body 11 and a pump cover 12 which are integrally coupled to each other by five bolts 10. Six reinforcing ribs $12_{1a}$ and $12_{1b}$ are projectingly provided on a surface of the pump cover 12 opposite the pump body 11 (see FIG. 5). Not only the supporting rigidity of a rear balancer shaft 22, which will be described hereinafter, can be enhanced, but also a variation in oil level due to sloshing of the oil within the oil pan 6 can be suppressed, by the reinforcing ribs $12_{1a}$ and $12_{1b}$. Particularly, the supporting rigidity of the rear balancer shaft 22 can be remarkably enhanced by the five reinforcing ribs $12_{1a}$ formed radiately on the journal portions of the rear balancer shaft 22.

The pump body 11 includes an intake port $11_1$ which opens into a mating surface thereof to the pump cover 12, a discharge port $11_2$ and a pump chamber $11_3$. An inner rotor 15 meshed with an outer rotor 14 rotatably carried in the pump chamber $11_3$ is coupled to and driven by a pump shaft 16 rotatably carried in the pump body 11.

An oil strainer 17 is provided for filtering the oil within the oil pan 6 to supply the filtered oil to the intake port $11_1$ of the oil pump 7, and has a mounting flange $17_1$ which is fastened to the pump cover 12 by two of the five bolts 10 for coupling the pump cover 12 to the pump body 11. The oil discharged from the discharge port $11_2$ of the oil pump 7 is supplied through an oil passage $11_4$ to an oil gallery 13 defined in the cylinder block 4 and then supplied therefrom as lubricating oil to various portions of the engine E.

Thus, the oil pump 7 having the above-described construction is coupled to the lower surface of the lower block 5 by two bolts 18, 18 passing through the pump body 11 below the #1 journal portion $1_1$, and by a single bolt 19 passed through the pump body 11 below between the #1 and #2 journal portions $1_1$ and $1_2$, i.e., at a location offset toward a bracing journal portion $26_4$.

As can be seen from FIG. 3, the oil passage $11_4$ is defined between the two bolts $18_1$ and 19 for fixing the oil pump 7 to the lower block 5 and at a location adjoining the bolt $18_1$. Therefore, the oil passage $11_4$ can be allowed to open at a position where the surface pressure of coupling between the pump body 11 and the lower block 5 is higher, and oil can be supplied to the main gallery 13 without an increase in the number of the fixing bolts more than required for assuring the pressure surface.

The secondary balancer device 8 includes a front balancer shaft 21 and the rear balancer shaft 22 which are rotated in opposite directions at a speed twice that of the crankshaft 1. The front balancer shaft 21 is comprised of a shaft body 23 and a pair of cylindrical covers 24 and 25. The shaft body 23 includes a pair of balancer weight portions $23_1$ and $23_2$ eccentric from a rotational axis of the shaft body 23, a main journal portion $23_3$ formed between both the balancer weight portions $23_1$ and $23_2$, a bracing journal portion $23_4$ formed at one of axial ends, and driving helical gear $23_5$ formed adjacent the main journal portion $23_3$. The pair of cylindrical covers 24 and 25 are disposed coaxially with the rotational axis and fixed to the shaft body 23 to cover the pair of balancer weight portions $23_1$ and $23_2$.

The rear balancer shaft 22 is also comprised of a shaft body 26 and a pair of cylindrical covers 27 and 28, as is the front balancer shaft 21. The shaft body 26 includes a pair of balancer weight portions $26_1$ and $26_2$ eccentric from a rotational axis of the shaft body 23, a main journal portion $26_3$ formed between both the balancer weight portions $26_1$ and $26_2$, a bracing journal portion $26_4$ formed at one of axial ends, and follower helical gear $26_5$ formed adjacent the main journal portion $26_3$. The pair of cylindrical covers 27 and 28 are disposed coaxially with the rotational axis and fixed to the shaft body 26 to cover the pair of balancer weight portions $26_1$ and $26_2$.

By covering the balancer weight portions $23_1$, $23_2$; $26_1$ and $26_2$ with the cylindrical covers 24, 25; 27 and 28 in the above manner, the balancer weight portions $23_1$, $23_2$; $26_1$ and $26_2$ can be prevented from stirring the oil within the oil pan 6, thereby alleviating the rotational resistance of the from and rear balancer shafts 21 and 22.

As can be seen from FIG. 4, the driving helical gear $23_5$ of the front balancer shaft 21 and the follower helical gear $26_5$ of the rear balancer shaft 22 are accommodated in a meshed relation within a gear chamber $29_1$ defined in a balancer holder 29 made of an iron-based material and coupled to the lower surface of the lower block 5. A thrust plate 31 for limiting the axial movement of the from and rear balancer shafts 21 and 22 is fixed to the balancer holder 29 by three bolts 32 to cover an opening in the gear chamber $29_1$.

The driving and follower gears $23_5$ and $26_5$ are provided between the main journal portions $23_3$ and $26_3$ of the bracing journal portions $23_4$ and $26_4$ of the balancer shafts 21 and 22 and in proximity to the main journal portions $23_3$ and $26_3$, respectively, leading to a very good meshing accuracy. In addition, the thrust plate 31 is formed from a single member and hence, the number of required parts is reduced, and it is easy to attach the thrust plate 31. An oil escaping bore $31_1$ is provided at a location where the pressure in the gear chamber $29_1$ is higher, and below the gear chamber $29_2$, which is convenient for escaping of the oil. Further, by the fact that the balancer holder 29 is made of the iron-based material having a small thermal coefficient of expansion, the variation in distance between axes of the balancer shafts 21 and 22 can be minimized, thereby preventing the generation of an abnormal sound due to a failure of meshing of the helical gears $23_5$ and $26_5$.

The bracing journal portion $23_4$ of the from balancer shaft 21 is supported in a bearing bore $11_5$ defined in the pump body 11, and the bracing journal portion $26_4$ of the rear balancer shaft 22 is supported in a bearing bore $12_2$ defined in the pump cover 12. The pump shaft 16 of the oil pump 7 and the rear balancer shaft 22 are disposed coaxially with each other, mad an oil chamber $12_3$ is defined in the pump cover 12 to communicate with the axial end of the pump shaft 16 through an oil passage $12_4$, so that the axial end of the bracing journal portion $26_4$ of the rear balancer shaft 22 faces the oil chamber $12_3$.

In this way, each of the balancer shafts 21 and 22 is supported at two places: at the lengthwise central main journal portion $23_3$, $26_3$ and the bracing journal portion $23_4$, $26_4$, respectively and hence, the vibration of the balancer shafts 21 and 22 with the rotation can be reliably prevented. Moreover, since the bracing journal portion $26_4$ of the rear balancer shaft 22 is supported in the bearing bore $12_2$ of the pump cover 12, the length of the rear balancer shaft 22 is shortened and hence, the balancer shaft 22 can be supported in a further stable manner. Further, since the pump body 11 is coupled to the lower surface of the lower block 5 by the bolt 19 at the location offset toward the bracing journal portion $26_4$, leading to a remarkably enhanced supporting rigidity of the rear balancer shaft 22.

Figure 7:
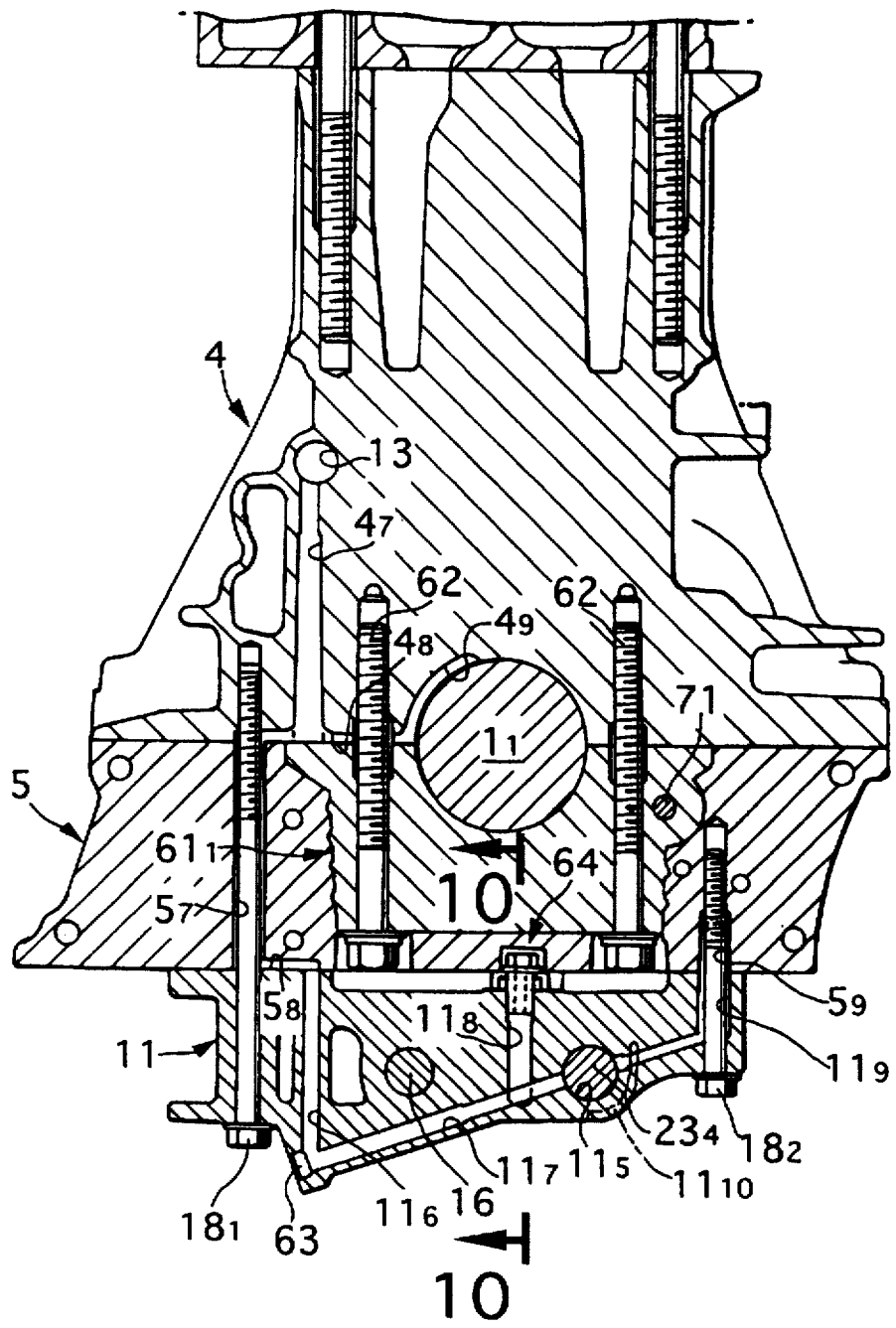

As can be seen from FIG. 7 corresponding to a section of the #1 journal portion 1 of the crankshaft 1, a bearing cap $61_1$ made of an iron-based material is provided in a cast-in manner in the lower block 5, and the lower block 5 is coupled to the lower surface of the cylinder block 4 by two bolts 62, 62 passed through the bearing cap $61_1$. The pump body 11 of the oil pump 7 is fixed to the lower surface of the lower block 5 by the two bolts $18_1$ and $18_2$, one of which is threadedly inserted into the cylinder block 4 through the lower block 5.

By connecting the front and rear opposite sidewalls of the cylinder block 4 by the lower block s having high rigidity, the rigidity of the cylinder block 4 can be enhanced, but also the rigidity of the pump housing 9 coupled to the lower block 5 can be enhanced, thereby reliably supporting the front and rear balancer shafts 21 and 22. In the case of the engine E including the oil pump 7 mounted at a different location, the lower block 5 can be coupled to the cylinder block 4 by replacing the bolt $18_1$ by a shorter bolt.

The main gallery 13 defined in the cylinder block 4 is connected to an oil passage $4_8$ defined in that surface of the cylinder block 4 which is mated to the lower block 5 through an oil passage $4_7$ defined in the cylinder block 4. The oil passage $4_8$ communicates with an oil channel $4_9$ surrounding a portion of the #1 journal portion $1_1$ of the crankshaft 1 for lubricating the #1 journal portion $1_1$, and is connected to an oil passage $11_6$ vertically defined in the pump body 11 through an oil passage $5_7$ defined between the lower block 5 and an outer periphery of one $18_1$ of the two bolts $18_1$ and $18_2$ and through an oil passage $5_8$ defined in that surface of the lower block 4 which is mated to the pump body 11. An oil passage $11_7$ is connected to a lower end of the oil passage $11_6$ and extends obliquely within the pump body 11, with its intermediate portion facing the bearing bore $11_5$ in the front balancer shaft 21, so that the bracing journal portion $23_4$ supported in the bearing bore $11_5$ is lubricated. An opening in an upstream end of the oil passage $11_7$ is occluded by a blind plug 63.

By defining the oil passage $5_7$ in the above manner utilizing the bolt bore through which the bolt $18_1$ is passed, the number of machining or cutting steps for the oil passage $5_7$ can be reduced. Since the oil passage 48 for lubricating the #1 journal portion $1_1$ of the crankshaft 1 is defined in the surface of the cylinder block 4 to the lower block 5, it is easy to make the oil passage $4_8$ in a machining or cutting manner.

An oil passage $11_8$ diverges upwards from the intermediate portion of the oil passage $11_7$ in the pump body 11 and is connected to an oil jet 64 (which will be described hereinafter) disposed in that surface of the lower block 5 which is mated to the pump body 11. The oil passage $11_7$ is connected at its downstream end to a chain tensioner 38 (which will be described hereinafter) through oil passages $11_9$ and $5_9$ defined around an outer periphery of the other $18_2$ of the two bolts $18_1$ and $18_2$.

As can be seen from FIGS. 1 and 4, a pump follower sprocket 33 and a balancer follower sprocket 34 are fixed to the axial end of the pump shaft 16 extending from the pump body 11 and the axial end of the front balancer shaft 21, respectively, and are connected by a driving sprocket 35 fixed to the axial end of the crankshaft 1 through an endless chain 36. A chain guide 37 is provide on a tensioned side of the endless chain 36, and a chain tensioner 38 is provided on a loosened side of the endless chain 36.

The number of teeth of the balancer follower sprocket 34 is set to a value which is one-half of the number of teeth of the driving sprocket 35, and the number of teeth of the pump follower sprocket 33 is set so that it is different from the number of teeth of the balancer follower sprocket 34. It is preferable for the performance of the oil pump 7 that the number of teeth of the balancer follower sprocket 34 is less than that of the pump follower sprocket 33. The endless chain 36 for driving the oil pump 7 and the front balancer shaft 21 is disposed inside an endless chain 36a for driving a camshaft, namely, on the side of the #1 journal portion $1_1$ of the crankshaft 1.

Figure 8:
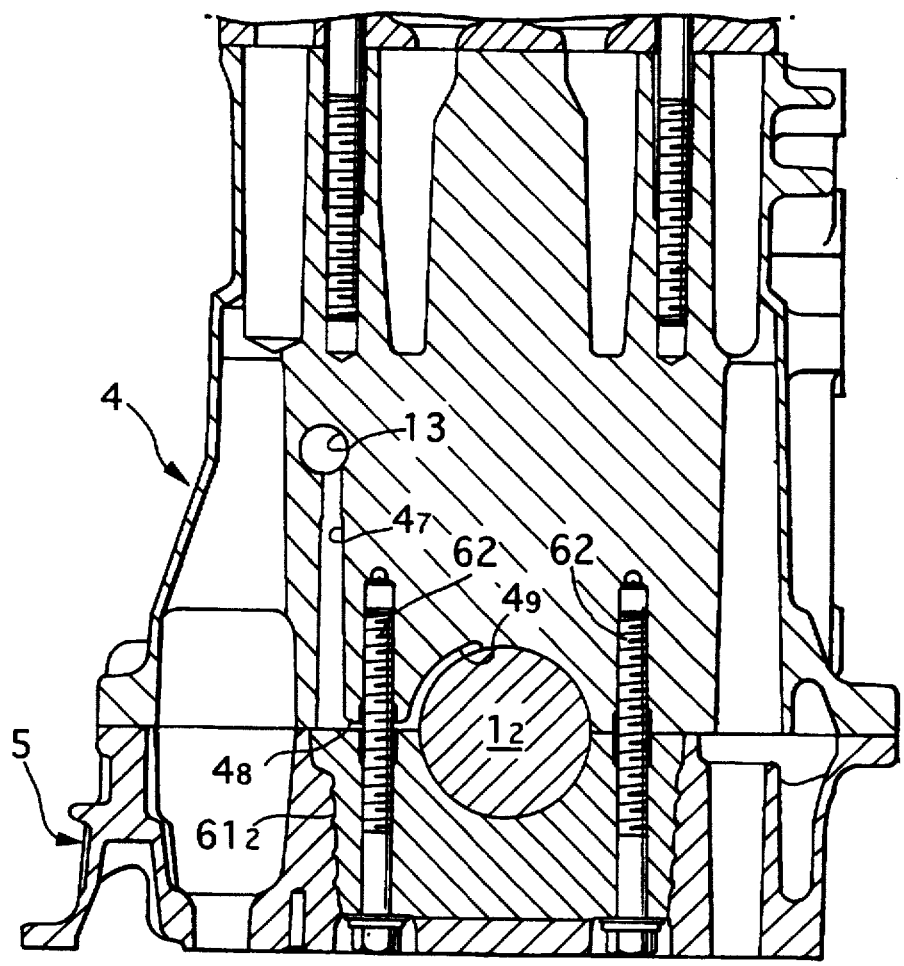

As can be seen from FIG. 8 corresponding to a section of the #2 journal portion $1_2$ of the crankshaft 1, a bearing cap $61_2$ made of an iron-based material is provided by coating in the lower block 5, and the lower block 5 is coupled to the lower surface of the cylinder block 4 by two bolts 62, 62 passing through the bearing cap $61_2$. The oil in the main gallery 13 defined in the cylinder block 4 is supplied through the oil passages $4_7$ and $4_8$ to the oil channel $4_9$ to lubricate the #2 journal portion $1_2$ or the crankshaft 1. The configuration of the oil passages in the sections corresponding to the #4 and #5 journal portions $1_4$ and $1_5$ of the crankshaft 1 is substantially the same as the configuration of the oil passage in the section corresponding to the #2 journal portion $1_2$.

Figure 9:
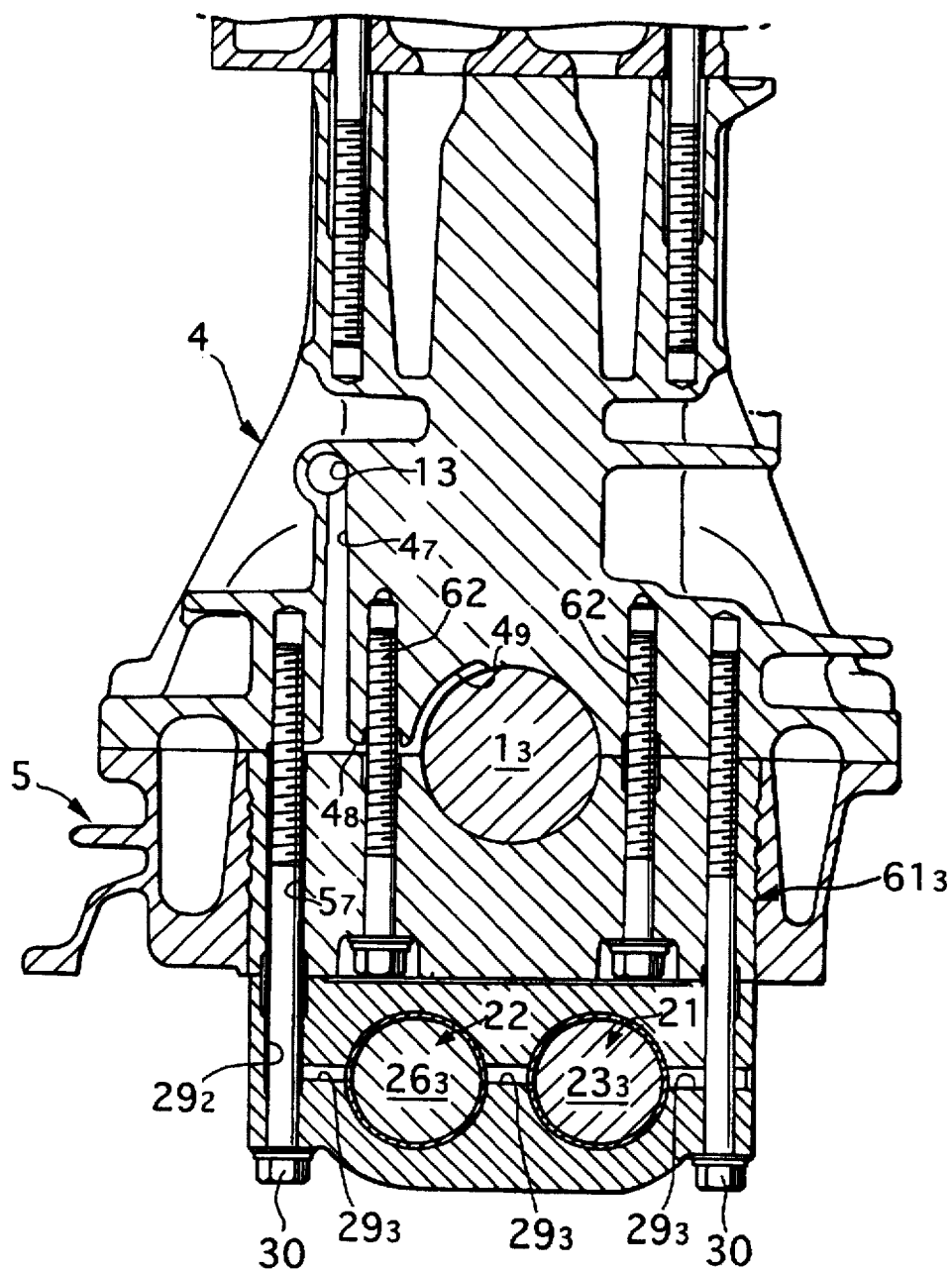
Figure 10:
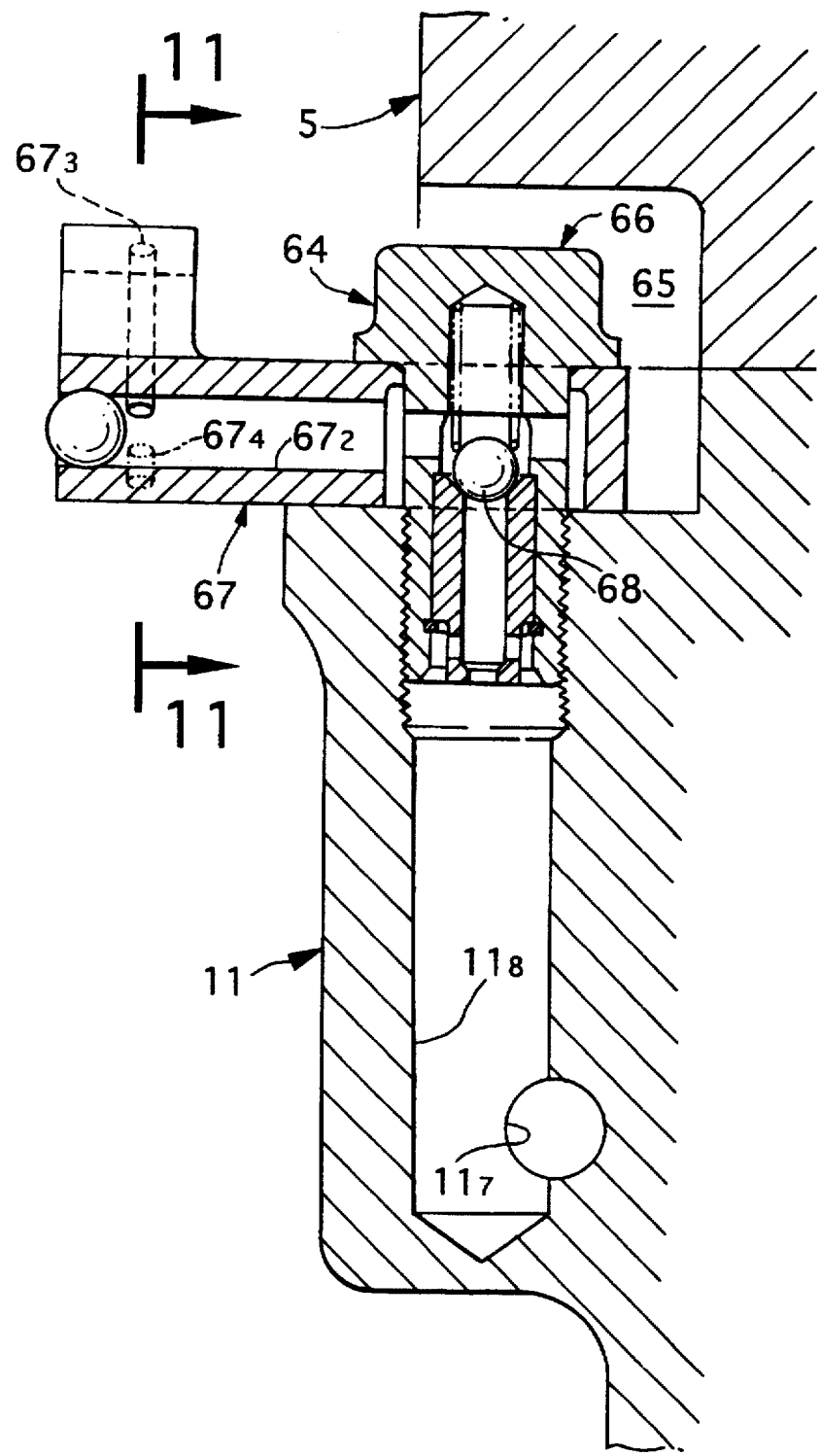
Figure 11:
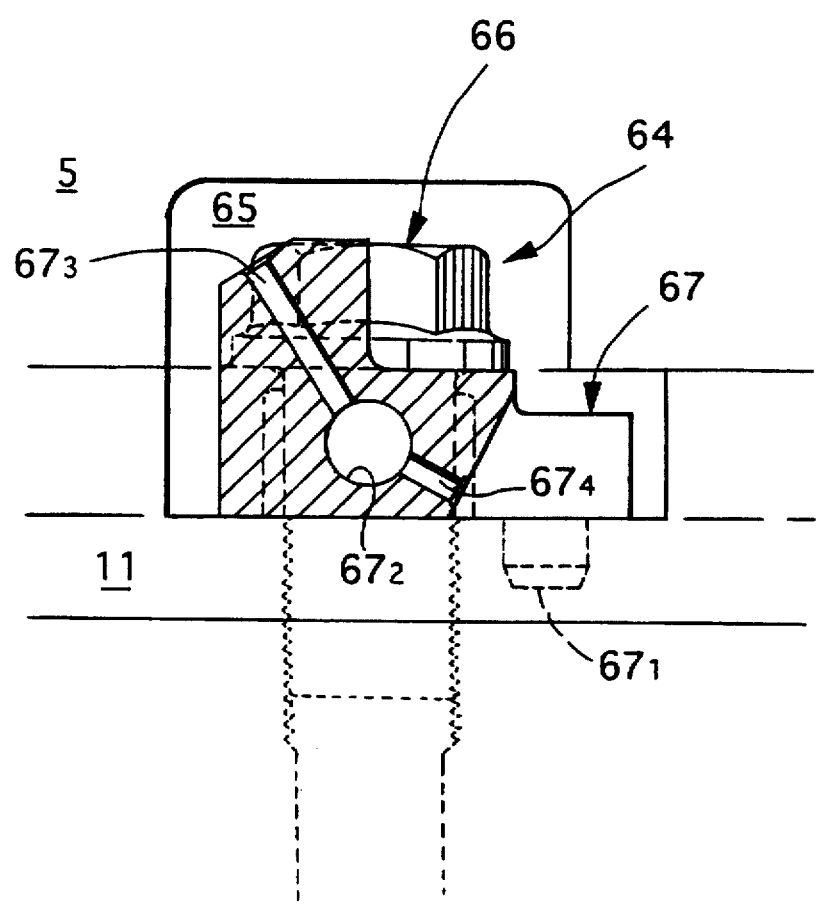

As can be seen from FIG. 9 corresponding to the section of the #3 journal portion of the crankshaft 1, a bearing cap $61_3$ made of an iron-based material is provided in a cast-in manner in the lower block 5, and the lower block 5 is coupled to the lower surface of the cylinder block 4 by two bolts 62, 62 passing through the bearing cap $61_3$. Two bolts 30, 30 for coupling a balancer holder 29 made of an iron-based material to the lower surface of the lower block 5 are threadedly inserted into the front and rear opposite sidewalls of the cylinder block 4 through the bearing cap $61_3$ made of the iron-based material provided in the cast-in manner in the lower block 5. By connecting the from and rear opposite sidewalls of the cylinder block 4 by the lower block 5 having the high rigidity in the above manner, not only the rigidity of the cylinder block 4 can be enhanced, but also the rigidity of the balancer holder 29 couple to the lower block 5 can be enhanced, thereby reliably supporting the front and rear balancer shafts 21 and 22.

The main gallery 13 defined in the cylinder block 4 is connected to the oil passage $4_8$ defined in the surface of the cylinder block 4 mated to the lower block 5 through the oil passage $4_7$ defined in the cylinder block 4. The oil passage $4_8$ communicates with an oil channel $4_9$ surrounding a portion of the #3 journal portion $1_3$ of the crankshaft 1 for lubricating the #3 journal portion $1_3$. The oil passage $4_8$ is also connected to a lubricating oil passage $29_3$ horizontally defined in the balancer holder 29 through oil passages $5_7$ and $29_2$ defined around an outer periphery of one of the two bolts 30, 30 passing through the bearing cap $61_3$ and the balancer holder 29. Thus, the respective main journal portions $23_3$ and $26_3$ of the front and rear balancer shafts 21 and 22 are lubricated through the lubricating oil passage $29_3$.

The structure of the oil jet 64 will be described below with reference to FIGS. 1, 2, 10 and 11.

A recess 65 is provided in the mated surfaces of the lower block 5 and the pump body 11 and opens into the rotational plane of the endless chain 36, and the oil jet 64 is threadedly mounted to the pump body 11, so that it is located in the recess 65. The oil jet 64 is comprised of a bolt portion 66 threadedly mounted to the pump body 11, and a nozzle portion 67 fixed by the bolt portion 66. The nozzle portion 67 is located relative to the pump body 11 by a knock pin $67_1$.

The oil passages $11_8$ defined in the pump body 11 communicates with an oil passage $67_2$ defined in the nozzle portion 67 through a check valve 68 which is provided within the bolt portion 66. A first nozzle $67_3$ and a second nozzle $67_4$ are formed in a downstream end of the oil passage $67_2$. The first nozzle $67_3$ is directed to meshed portions of the driving sprocket 35 and the endless chain 36, while the second nozzle $67_4$ is directed to meshed portions of the balancer follower sprocket 34 and the endless chain 36. Since the oil jet 64 is disposed in the recess 65 defined in the mated surfaces of the lower block 5 and the pump body 11 as described above, the oil jet 64 can be laid-out in a compact manner without interfering with other members.

The recess 65 is defined at a located keeping out of the bearing cap 61 made of the iron-based material, i.e., in the lower block 5 made of an aluminum-based material below the bearing cap $61_1$, and hence, not only the recess 65 can be easily machined, but also the rigidity of the bearing cap 61 cannot be reduced. Further, the recess 65 is defined at a location offset to the front from the axis of the crankshaft 1 (see FIG. 1) and hence, a sufficient amount of the oil can be supplied to the meshed portions of the balancer follower sprocket 34 of the front balancer shaft 21 which is rotated at a higher speed than the oil pump 7 and the endless chain 36. Moreover, the reduction in rigidity due to the recess 65 can be minimized by offsetting from the location which is just below the axis of the crankshaft 1 and in which the maximum load is applied. Further, the bolt portion 66 of the oil jet 64 is disposed coaxially with the oil passage $11_8$ and hence, the configuration of the oil passage is not complicated, and it is unnecessary to mount a blind plug in the oil passage $11_8$.

Figure 12:
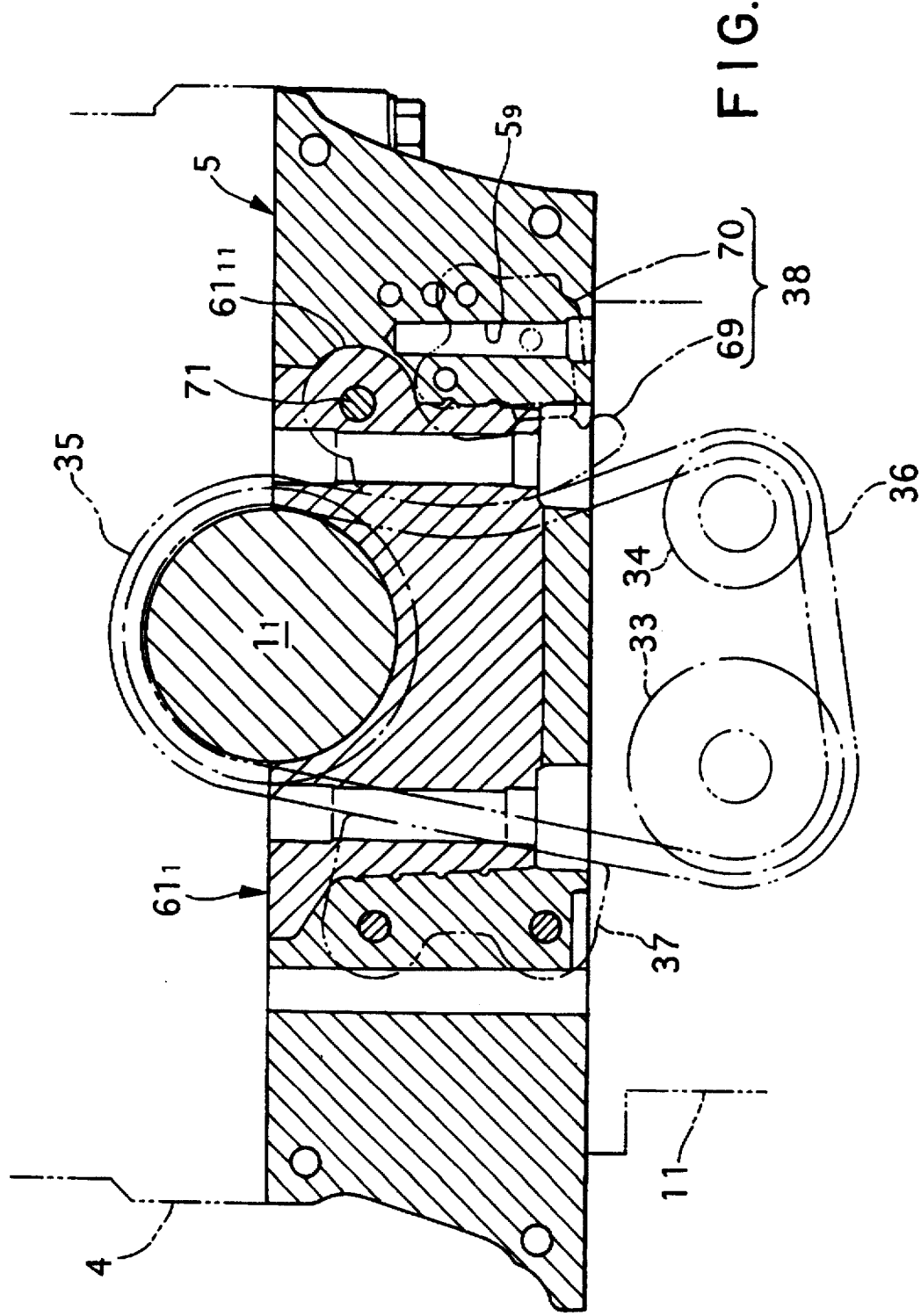

FIG. 12 illustrates the chain tensioner 38. The chain tensioner 38 is comprised of a bow-like shoe 69 which is in sliding contact with the endless chain 36, and a hydraulic cylinder 70 for biasing the shoe 69 toward the endless chain 36. A pivot 71 for pivotally supporting the shoe 69 is supported on the bearing cap $61_1$ made of the iron-based material provided in the cast-in manner in the lower block 5 to keep out of the lower block 5 made of the aluminum-based material and hence, the pivot 71 has an enhanced supporting strength. A bulged portion $61_{11}$ formed by bulging the bearing cap $61_1$ into an arcuate shape is provided sideways of the pivot 71 and hence, the supporting strength of the pivot 71 is further enhanced. Moreover, the bulged portion $61_{11}$ conveniently acts as a slip-off prevention configuration for the bearing cap $61_1$ embedded in the lower block 5.

An oil passage $5_9$ connected to the hydraulic cylinder 70 is defined in only the lower block 5 and does not pass through coupled surfaces of the lower block 5 and the bearing cap $61_1$ made of the iron-based material. Therefore, the oil passage $5_9$ can be easily machined, and there is no possibility of the occurrence of leakage of the oil from such coupled surfaces. In addition, since the hydraulic cylinder 70 is provided below the pivot 71, the length of the oil passage $5_9$ for supplying the oil to the hydraulic cylinder 70 can be shortened. Further, an arcuate rib $11_{10}$ (see FIGS. 1 and 7) for preventing the tooth jump of the endless chain 36 is formed in the vicinity of the oil passages $11_7$ and $11_9$, i.e., so that the oil passage $11_7$ and the arcuate rib $11_{10}$ overlap each other, as viewed from the axial direction of the front balancer shaft 21. Therefore, the reduction in rigidity of the pump body 11 due to the provision of the oil passages $11_7$ and $11_9$ can be prevented to enhance the supporting rigidity for the front balancer shaft 21.

The operation of the embodiment of the present invention having the above-described arrangement will be described below.

When the engine E is driven, the rotation of the crankshaft 1 is transmitted through the driving sprocket 35 and the endless chain 36 to the pump follower sprocket 33 and the balancer follower sprocket 34. Since the number of teeth of the balancer follower sprocket 34 is set at a value one-half of that of the driving sprocket 35, the front balancer shaft 21 and the rear balancer shaft 22 connected to the from balancer shaft 21 through the driving helical gear $23_5$ and the follower helical gear $26_5$ having the same number of teeth are rotated in opposite directions at a rotational speed twice that of the crankshaft 1 to alleviate the secondary vibration of the engine E. In addition, since the number of teeth of the pump follower sprocket 33 is different from that of the balancer follower sprocket 34, the pump shaft 16 is rotated at a speed different from the speed of the balancer shafts 21 and 22 (e.g., It a speed one-half of the speed of the balancer shafts 21 and 22).

In this way, the pump shaft 16 and the rear balancer shaft 22 disposed below the cylinder block 4 are disposed coaxially in a separated manner and are driven independently Therefore, the size of the oil pump 7 cannot be increased and moreover, not only the oil pump 7 and the rear balancer shaft 22 can be disposed in a compact manner below the cylinder block 4, but also the speed of the oil pump 7 is independent of the rear balancer shaft 22, thereby permitting freedom of design. The pump shaft 16 and the rear balancer shaft 22 are not necessarily disposed exactly coaxially with each other, but if the design for reduction in size and design freedom of the engine E are taken into consideration, it is preferable that the pump shaft 16 and the rear balancer shaft 22 are disposed coaxially with each other, as in the embodiment.

As can be seen from FIG. 4, an oil supply channel $12_5$ is defined in a surface of the pump cover 12 opposed to the pump shaft 16 and communicates at one end with the discharge port $11_2$ of the oil pump 7. The other end of the oil supply channel $12_5$ communicates with the axial oil passage $12_4$ defined in the pump cover 12 and hence, the oil supplied from the discharge port $11_2$ through the oil supply channel $12_5$ is supplied via the axial oil passage $12_4$ to the oil chamber $12_3$ to lubricate the bracing journal portion 26 of the rear balancer shaft 22 supporting the bearing bore $12_2$ connected to the oil chamber $12_3$.

Because the oil passage $12_4$ is defined in the pump cover 12 in the above manner, the bracing journal portion 26 of the rear balancer shaft 22 can be lubricated using an oil passage having a minimum length.

The rear balancer shaft 22 is biased in a direction of an arrow A in FIG. 4 by a reaction force received by the follower helical gear $26_5$ of the rear balancer shaft 22 from the driving helical gear $23_5$ of the front balancer shaft 21. However, the axial end of the bracing journal portion $26_4$ of the rear balancer shaft 22 is biased in a direction of an arrow B by a hydraulic pressure applied to the oil chamber $12_3$ through the oil supply channel $12_5$ and the axial oil passage $12_4$ defined in the pump cover 12 and hence, the movement of the rear balancer shaft 22 in the thrust direction can be restrained to prevent the generation of an abnormal sound.

Now, as shown in FIG. 9, the oil supplied from the oil pump 7 to the main gallery 13 in the cylinder block 4 is supplied via the oil passages $4_7$ and $4_8$ in the cylinder block 4, the oil passage $5_7$ in the lower block 5 and the oil passage $29_2$ in the balancer holder 29 to the lubricating oil passage $29_3$ in the balancer holder 29 to lubricate the main journal portions $26_3$ and $23_3$ of the rear and front balancer shafts 22 and 21.

As shown in FIG. 7, the oil supplied from the oil pump 7 to the main gallery 12 in the cylinder block 4 is also supplied via the oil passages $4_7$ and $4_8$ in the cylinder block 4, the oil passages $5_7$ and $5_8$ in the lower block 5 and the oil passages $11_6$ and $11_7$ in the pump body 11 to lubricate the bracing journal portion $23_4$ of the front balancer shaft 21.

The oil supplied to the oil jet 64 through the oil passage $11_8$ diverging from the intermediate portion of the oil passage $11_7$ in the pump body 11 is jetted from the first nozzle $67_3$ to the meshed portions of the driving sprocket 35 and the endless chain 36 and also from the second nozzle $67_4$ to the meshed portions of the balancer follower sprocket 34 and the endless chain 36 to lubricate the meshed portions. When the speed of the engine E is low and the pressure of oil discharged from the oil pump 7 is low, the check value 68 of the oil jet 64 is closed to limit the jetting of the oil, thereby preventing a further reduction in hydraulic pressure. The oil supplied to the chain tensioner 38 (see FIG. 12) through the oil passages $11_9$ and $5_9$ diverging from the downstream end of the oil passage $11_7$ operates the hydraulic cylinder 70 of the chain tensioner 38 to bring the shoe 69 into pressure contact with the endless chain 36, thereby applying predetermined tension to the endless chain 36.

In this way, the number of machined oil passages can be reduced by the fact that the oil is supplied to the oil jet 64 and the chain tensioner 38 by utilizing the oil passage $11_7$ for lubricating the bracing journal portion $23_4$ of the front balancer shaft 21.

Figure 13:
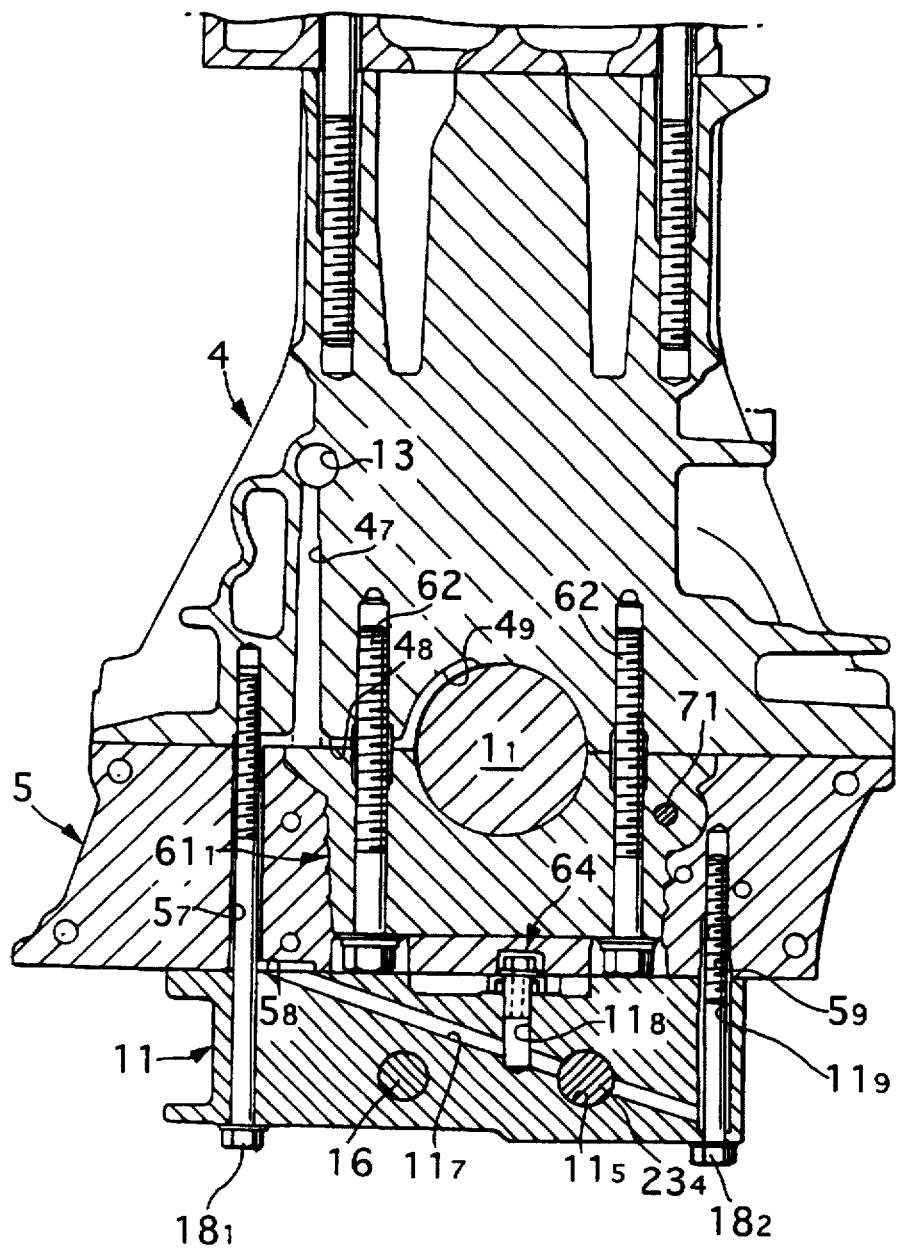
FIG. 13 is a view similar to FIG. 7, but illustrating a second embodiment of the present invention.

FIG. 13 illustrates a second embodiment of the present invention. In the second embodiment, an oil passage $11_7$ defined in the pump body 11 is inclined in a direction opposite from that in the first embodiment shown in FIG. 7. Thus, the oil passage $11_6$ and the blind plug 63 required in the first embodiment are not required, leading to a further reduction in number of machining steps and the number of parts.

Although the embodiments of the present invention have been described in detail, it will be understood that the present invention is not limited to the above-described embodiments, and various modifications may be made without departing from the spirit and scope of the invention defined in claims.

For example, the pump body 11 and the balancer holder 29 are utilized as the balancer shaft supporting members in the embodiment, but the balancer shaft supporting member is not limited to the pump body 11 and the balancer holder 29.

What is claimed is:

1. A balancer shaft supporting structure in an engine including a balancer shaft disposed below a cylinder block, said balancer shaft supporting structure comprising:

a lower block abutting against opposite sidewalls of the cylinder block and having a bearing cap for supporting journal portions of a crankshaft; and a balancer shaft supporting member for supporting the balancer shaft, said balancer shaft supporting member abutting against a lower surface of said lower block, said lower block and said balancer shaft supporting member being commonly clamped to said cylinder block by a common bolt passing through a bolt bore which is utilized as an oil passage for supplying oil to journal portions of said balancer shaft.

2. A balancer shaft supporting structure in an engine including a balancer shaft disposed below a cylinder block, said balancer shaft supporting structure comprising:

a lower block fixed to opposite sidewalls of said cylinder block and having a bearing cap for supporting journal portions of a crankshaft;

a balancer shaft supporting member fixed to a lower surface of said lower block for supporting said balancer shaft;

an oil jet disposed in a recess defined in mated surfaces of said lower block and said balancer shaft supporting member for supplying oil to an endless chain for driving said balancer shaft; and an oil passage for supplying oil to said oil jet, said oil passage being in communication with an oil passage defined in said balancer shaft supporting member to supply the oil to journal portions of said balancer shaft.

3. A balancer shaft supporting structure in an engine including a balancer shaft disposed below a cylinder block, said balancer shaft supporting structure comprising:

a lower block made of an aluminum-based material and fixed to opposite sidewalls of said cylinder block made of an aluminum-based material, said lower block having a bearing cap made of an iron-based material and embedded therein for supporting journal portions of a crankshaft;

a balancer shaft supporting member fixed to a lower surface of said lower block for supporting said balancer shaft; and an oil passage for supplying oil to the journal portions of said crankshaft, said oil passage being defined in a surface of said cylinder block with said lower block coupled thereto, which is opposed to said bearing cap, so as to diverge from an oil passage for supplying oil to journal portions of said balancer shaft.

4. A balancer shaft supporting structure in an engine according to claim 3, further including a chain tensioner for applying a tension to an endless chain for transmitting a driving force of the crankshaft to an accessory mounted below the cylinder block, said chain tensioner including a chain abutment member supported on said bearing cap made of iron-based material.

5. A balancer shaft supporting structure in an engine according to claim 4, wherein said chain tensioner is of a hydraulic type, wherein said balancer shaft supporting structure further includes an oil passage defined in said lower block to keep oil out of said bearing cap for supplying oil to said chain tensioner.

6. A balancer shaft supporting structure in an engine including a balancer shaft disposed below a cylinder block, said balancer shaft supporting structure comprising:

a lower block which is made of an aluminum-based material and disposed to abut against opposite sidewalls of said cylinder block, and which has a bearing cap made of an iron-based material and embedded therein for supporting journal portions of a crankshaft; and a balancer shaft supporting member abutting against a lower surface of the lower block for supporting said balancer shaft, said lower block and said balancer shaft supporting member being commonly clamped to the cylinder block by a common bolt.

7. A balancer shaft supporting structure in an engine according to claim 6, further including a chain tensioner for applying a tension to an endless chain for transmitting a driving force of the crankshaft to an accessory mounted below the cylinder block, said chain tensioner including a chain abutment member supported on said bearing cap made of iron-based material.

8. A balancer shaft supporting structure in an engine according to claim 7, wherein said chain tensioner is of a hydraulic type, and wherein said balancer shaft supporting structure further includes an oil passage defined in said lower block to keep oil out of said bearing cap for supplying oil to said chain tensioner.

9. A balancer shaft supporting structure in an engine according to claim 1, further including an oil jet for supplying oil to an endless chain for driving said balancer shaft, said oil jet being disposed in a recess defined in mated surfaces of said lower block and said balancer shaft, wherein an oil passage for supplying oil to said oil jet is provided in communication with said oil passage defined in said balancer shaft supporting member to supply oil to the journal portions of said balancer shaft.

10. A balancer shaft supporting structure in an engine according to claim 1, wherein said lower block is made of an aluminum-based material and has a bearing cap made of an iron-based material embedded therein for supporting the journal portions of the crankshaft, and wherein an oil passage for supplying the oil to the journal portions of the crankshaft is defined in a surface of said cylinder block, opposed to said bearing cap to which said lower block is coupled, so as to diverge from said oil passage for the journal portions of said balancer shaft.

11. A balancer shaft supporting structure in an engine according to claim 1, wherein said lower block is made of an aluminum-based material and has a bearing cap made of an iron-based material embedded therein for supporting the journal portions of the crankshaft, and said cylinder block is made of an aluminum-based material.

12. A balancer shaft supporting structure in an engine according to claim 1, further comprising:

a bearing cap made of an iron-based material for supporting the journal portions of the crankshaft, said bearing cap being embedded in said lower block made of an aluminum-based material; and a chain tensioner for applying a tension to an endless chain for transmitting a driving force of the crankshaft to an accessory mounted below the cylinder block, said chain tensioner having a chain abutment member supported on said bearing cap made of iron-based material.

13. A balancer shaft supporting structure in an engine according to claim 12, wherein said chain tensioner is of a hydraulic type, and wherein said balancer shaft supporting structure further includes an oil passage defined in said lower block to keep oil out of said bearing cap for supplying the oil to said chain tensioner.

* * * * *